United States Patent [19]

Lock et al.

[11] Patent Number: 4,465,713

[45] Date of Patent: Aug. 14, 1984

[54] URETHANE COATINGS FROM ALIPHATIC AROMATIC DIISOCYANATES

[75] Inventors: Michele R. Lock; Kurt C. Frisch, Jr., both of Midland, Mich.

[73] Assignee: The Dow Chemical Company, Midland, Mich.

[21] Appl. No.: 419,671

[22] Filed: Sep. 20, 1982

[51] Int. Cl.³ .............................................. B05D 3/02
[52] U.S. Cl. .................. 427/385.5; 427/386; 427/387; 427/389.7; 427/389.9; 427/391; 427/393; 427/393.5
[58] Field of Search ............... 427/386, 387, 393, 391, 427/389.7, 393.5, 385.5, 389.9

[56] References Cited

U.S. PATENT DOCUMENTS

| | | |
|---|---|---|
| 4,104,432 | 8/1978 | Manabe et al. ..................... 428/216 |
| 4,214,016 | 7/1980 | Manabe et al. ..................... 427/54.1 |
| 4,289,827 | 9/1982 | Noll et al. ......................... 427/389 X |
| 4,299,868 | 11/1981 | Berndt et al. ..................... 427/389.9 |
| 4,331,735 | 5/1982 | Shanoski ...................... 427/389.8 X |

FOREIGN PATENT DOCUMENTS 1443715  7/1976  United Kingdom .

*Primary Examiner*—Thurman K. Page
*Attorney, Agent, or Firm*—J. S. Boone

[57] ABSTRACT

A surface is coated with a mixture of (i) an aliphatic, aromatic polyisocyanate such as 1,3-bis-(1-isocyanato-1-methylethyl)benzene, and (ii) a polyactive hydrogen compound such as a poly(2-hydroxyethylacrylate), and the mixture is cured under conditions such that an adherent, solid coating is formed on the surface. The coatings of the invention have surprising gloss and lack of yellowness after exposure to ultra-violet light.

10 Claims, No Drawings

URETHANE COATINGS FROM ALIPHATIC AROMATIC DIISOCYANATES

BACKGROUND OF THE INVENTION

This invention relates to urethane coatings prepared from a polyisocyanate material and a polyactive hydrogen material.

The use of polyisocyanates and polyactive hydrogen compounds to form urethane coatings is well known. When properly formulated and applied, these materials generally exhibit good adhesion to metal substrates, water resistance, solvent resistance, and gloss.

One deficiency of these coatings, however, is the occurrence of yellowing and loss of gloss upon exposure to ultra-violet light. Indeed, yellowing is so severe for conventional aromatic isocyanates, such as toluene diisocyanate, that such compounds are generally not even considered for use in exterior coatings applications.

SUMMARY OF THE INVENTION

In one aspect, the invention is a method of coating a surface, comprising applying to the surface, a mixture comprising an aliphatic, aromatic polyisocyanate and a polyahl, and curing the mixture under conditions such that an adherent, solid coating is formed on said surface. In another aspect, the invention is the coated surface produced by the aforementioned method.

Coatings produced according to the invention exhibit surprising gloss retention and resistance to yellowing.

DETAILED DESCRIPTION OF THE INVENTION

The practice of the invention contemplates the use of an aliphatic, aromatic polyisocyanate and a polyactive hydrogen compound.

As the aliphatic, aromatic polyisocyanate virtually any compound having an aromatic ring and more than one isocyanate moiety, wherein the isocyanate moieties are separated from the aromatic ring by at least one carbon atom, and the isocyanate moieties are available for participation in an urethane reaction, are usable in the invention. Preferably, the isocyanate will have a structure according to the formula:

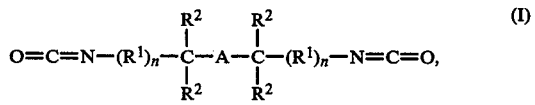

wherein A is an organic radical including at least one aromatic ring, desirably an aromatic ring having from six to twelve members forming the ring, preferably an aromatic ring having six carbon atoms forming the ring; each $R^1$ is independently an aliphatic radical, desirably an aliphatic radical having from one to six carbon atoms, preferably an aliphatic radical having one to three carbon atoms; each n is independently zero or one, preferably zero; and each $R^2$ is independently an organic or inorganic radical, desirably a hydrogen, a halogen or an aliphatic radical having from one to six carbon atoms, preferably an aliphatic radical having one to three carbon atoms, and more preferably a methyl radical. In a particularly preferred embodiment, the isocyanate is 1,4-bis(1-isocyanato-1-methylethyl)-benzene (an alternative name is p-α,α,α',α'-tetramethyl-α,α'-diisocyanatoxylene). In a most preferred embodiment, the isocyanate is 1,3-bis(1-isocyanato-1-methylethyl)benzene (an alternative name is m-α,α,α',α'-tetramethyl-α,α'-diisocyanatoxylene), which is shown by the following formula:

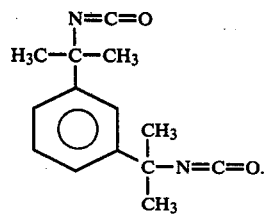

There are at least three routes suitable for producing the isocyanate of Formula II. The first is the reaction of 1,3-bis(isopropenyl)benzene with cyanic acid (HOCN) (the reaction of an aromatic isopropenyl moiety to form a 1-isocyanato-1-methylethyl moiety is taught, for instance, by F. W. Hoover et al., J. Org. 29,143 (1964)). The second is the reaction of 1,3-bis-(1-methyl-1-ethylol) benzene with cyanogen chloride (ClCN) to produce 1,3-bis(1-cyanato-1-methylethyl) benzene, which is rearranged to result in the isocyanate of Formula II. Cyanate/isocyanate rearrangement is discussed, for example, in *Angewandte Chemie International Edition*, Vol. 3, page 311, (1964); and *Acta Chemica Scandinavica*, Vol. 19, page 438 (1965). The third route is the phosgenation of 1,3-bis(1-amino-1-methylethyl)benzene.

The invention also contemplates, for reaction with the aliphatic, aromatic polyisocyanate, a "polyahl". The term "polyahl" generally includes any polyfunctional compounds having an average greater than 1 active hydrogen moiety which displays significant activity according to the Zerewitinoff test described by Woller in the *Journal of American Chemical Society*, Vol. 49, page 3181 (1927). Specifically included within the definition of polyahl are polyols, polyamines, polyamides, polymercaptans and polyacids. Also specifically included are compounds having more than one -SeH or -TeH groups. Further, suitable compounds may be those with active hydrogens supplied from more than one type of active hydrogen moiety. Examples of these compounds include amino alcohols and mercapto alcohols. Importantly, suitable polyahls also specifically include those compounds having 3 or more active hydrogen moieties per molecule.

Examples of amines which are suitable polyahls for use in the instant invention include ethylenediamine, 1,2- and 1,3-diaminopropane, 1,7-diaminohexane, monoethanolamine, diethanolamine, diaminobenzene, diaminotoluene and the like.

Examples of polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and a hydroxyl group. Also alkylene adducts of compounds which contain one —SH group and one —OH group as well as those which contain an amino group and a —SH group may be used.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol; 1,5-pentane diol, 1,7-heptane diol, glycerol, 1,1,1-trimethylolpropane, 1,1,1-trimethylolethane, hexane-1,2,6-triol, alphamethyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxylphenyl)-propane, commonly known as bisphenol A, and bisphenol F. Also included are alkylene oxide derivatives of bisphenol A, bisphenol F, etc., and hydrolyzed derivatives of epoxy resins such as hydrolyzed D.E.R. ® 331 (available from The Dow Chemical Company).

Illustrative oxiranes that are advantageously employed in the preparation of the polyether polyol include simple alkylene oxides such as ethylene oxide, propylene oxide, butylene oxide and amylene oxide; glycidyl ethers such as t-butyl glycidyl ether and phenyl glycidyl ether and random or block copolymers of two or more of these oxiranes. The polyalkylene polyether polyols may be prepared from other starting materials such as tetrahydrofuran and alkylene oxidetetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. The polyalkylene polyether polyols may be prepared by any known process such as, for example, the process disclosed by Wirtz in 1859 and Encyclopedia of Chemical Technology, Vol. 7, pp. 257–262, published by Interscience Publishers, Inc. (1951) or in U.S. Pat. No. 1,922,459. Also suitable are polyether polyols and processes for preparing them that are described in Schick, M. J., Nonionic Surfactants, Marcel Dekker, Inc., New York (1967), U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, propylene glycol and blends thereof having hydroxyl equivalent weights up to about 5,000.

Polyhydric thioethers which are sometimes advantageously condensed with alkylene oxides include the reaction product of thiodiglycol with alkylene oxides or dihydric alcohol such as disclosed above for the preparation of the hydroxyl-containing polyethers with any other suitable thioether glycol.

Polyhydroxyl-containing phosphorus compounds which are optionally used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Polyacetals (acetal resins) which are optionally reacted with alkylene oxides or other oxiranes include the reaction product of formaldehyde or other suitable aldehyde with a polyhydric alcohol or an oxirane such as those disclosed above. Polyacetals derived from acetone or from cyclic acetals are also suitably employed.

Aliphatic and aromatic thiols which are optionally reacted with alkylene oxides and other oxiranes include alkane thiols such as 1,2-ethane dithiol, 1,2-propane dithiol and 1,6-hexane dithiol; alkene thiols such as 2-butene-1,4-dithiol and alkyne thiols such as 3-hexyne-1,6-dithiol and arene thiols such as 1,4-benzene dithiol. Other thiols suitable for this purpose are hydrogen sulfide as well as thio functional polymers such as polyvinylbenzyl thiol.

Acids and amides which are optionally reacted with alkylene oxides and other oxiranes include difunctional fatty acids such as hydroxystearic and dihydroxystearic acid as well as amides such as fatty acid alkanol amides, e.g., lauroyl monoethanolamide; diacids such as adipic and terephthalic acid; sulfonamides and other acids and amides set forth in Schick, supra.

Amines which are optionally reacted with alkylene oxides and other oxiranes include aromatic amines such as aniline, o-chloroaniline, p-amino aniline, 1,5-diamino naphthalene, methylene dianiline, the condensation products of aniline and formaldehyde and 2,4-diaminotoluene; aliphatic amines such as methylamine, triisopropanolamine, isopropanolamine, diisopropanolamine, ethylenediamine, 1,3-propylenediamine, 1,4-butylenediamine and 1,3-butylenediamine, mixtures thereof and the like.

Additional polyethers and methods for their preparation are set forth in Schick, supra.

Examples of suitable hydroxy-containing polyesters include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha-,beta-diethylsuccinic acid, isophthalic acid, terephthalic acid, hemimellitic acid and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, alphamethyl glycoside, pentaerythritol and sorbitol. Also included within the term "polyhydric alcohol" are compounds derived from phenols such as 2,2(4,4'-hydroxyphenyl)propane, commonly known as bisphenol A.

Other polyahls suitably employed include polylactones, hydroxy functional acrylic polymers such as polymers of hydroxyethyl acrylate and hydroxypropyl acrylate, polyvinyl acetate and other polymers of vinyl acetate and other ethylenically unsaturated carboxylic acids, hyroxyl-containing epoxy resins, urea-formaldehyde and melamine-formaldehyde resins, hydroxyl-containing polycarbonates and polyurethanes, methylol resins, starches and other cellulosic polymers, esters of phosphoric, sulfonic, sulfuric and boric acid and polypeptides.

Additional polyols include glycols such as ethylene glycol, 1,2-propylene glycol, 1,3-propylene glycol, 1,4-butylene glycol, 1,3-butylene glycol, 1,2-butylene glycol and the like, glycerine, 1,1,1-trimethylolpropane, pentaerythritol and the like.

Polymercaptans include hydrogen sulfide, 1,2-dimercaptoethane, 1,3-dimercaptopropane, low molecular weight Thiokol ® polysulfide elastomers and the like.

Polyphenols include bisphenol A, bisphenol F and the like.

Polyacids include adipic acid, sebaccic acid, terephthalic acid and the like.

Other polyahls include compounds having mixed functionalities such as 2-mercaptoethanol, 2-aminoethanol, mercaptophenol and the like.

Of the above classes of polyahls; polyols, polymercaptans and polyamines are preferred. Polyols are particularly available and safe to handle, as well as easy to use. Glycols and glycol ethers are readily used in the invention. Acrylic polyols (e.g., the addition polymerization product of a hydroxyalkyl ester of an unsaturated acid, such as 2-hydroxypropyl acrylate) are most preferred.

When formulating coatings according to the invention, the polyisocyanate and polyahl should be present in a ratio such that they are capable of being reacted with one another to form a substantially solid material. Since suitable polyahls specifically include those compounds having three or more active hydrogen moieties per molecule, it is important, in defining reaction ratios, to specify whether equivalent ratios or molecular ratios are being used. It is generally desirable, from a toxicological standpoint, to have a slight excess of active hydrogen moiety. While slight excesses of one component (e.g., up to 10 molar percent excess) are not unduly harmful to coating properties, it is preferable to have about one equivalent of isocyanate for each equivalent of hydrogen.

While not a requirement of the invention, preferred coating formulations will include a catalyst to promote the reaction between the isocyanate and active hydrogen moieties. Suitable catalysts (typically referred to in the art as "urethane catalysts") include those catalysts commonly used in the manufacture of urethane foams and urethane coatings. Typical examples include dibutyltin dilaurate and stannous octoate. These and other catalysts and their use are well known to those skilled in the polyurethane art. Further information may be obtained, for example, in U.S. Pat. No. 4,233,425.

Though not required, it is generally desirable to store the polyahl and polyisocyanate components of the coating composition in separate containers and to mix them only immediately before use. The catalyst may be added to either one or both of the separate containers, or its addition may be delayed until the separate components are mixed for application.

Application of coating composition to a substrate may be achieved by any conventional coating means and apparatus. For instance, the coatings may be applied by brush, spray gun, electrostatic spray gun, knife blade, air blade, draw down wire, and so forth.

The substrate may be virtually any material suitable for receiving a coating composition. Examples include wood, paper, glass, metal and plastics.

After application of the coating application to the substrate, the coating composition is allowed to cure. Conditions required for curing depend upon the particular isocyanate, polyahl, and catalyst used. While sufficient cure may normally be achieved by leaving the coated substrate at ambient conditions, decreased cure times can usually be achieved by subjecting the coating to elevated temperatures, for instance, about 50° C.

The coatings of the invention have excellent gloss and lack of yellowing immediately after curing, and have particularly surprising retention of gloss and absence of yellowing after exposure to ultra-violet light. These properties make the coating compositions of the invention particularly useful for outdoor applications such as auto finishes and sign coatings.

The invention will be further explained in the following examples. In the examples all parts and percentages are by weight unless otherwise specified.

EXAMPLE 1

An acrylic polyol is prepared by adding 802 g or urethane grade 2-ethoxyethylacetate (Cellosolve Acetate) to an oven dried 2-liter, 3-neck flask, fitted with an addition funnel, mechanical stirrer, condenser topped with a nitrogen line, heating mantle and thermocouple. To the funnel, 405 g butyl acrylate, 135 g ethyl acrylate, 270 g 2-hydroxypropyl acrylate, and 90 g styrene are added and stirred gently. 25.5 Grams of t-butylperoctoate is then added to the monomer mixture through the addition funnel. The solvent in the flask is heated to 135° C. and the monomer solution is added dropwise to the heated solvent at a relatively constant rate for about 5.5 hours. Care is taken to keep a constant temperature and stirring rate in order to control the molecular weight distribution. After the monomer addition is complete the mixture is maintained at 135° C., with stirring, for 1 additional hour. The temperature is then lowered to 90° C., and 2 g of a low temperature azo initiator (Vazo 52) is added and the mixture maintained at 90° C. for 1 hour. The polyol product is a colorless, slightly hazy solution of medium viscosity (Gardner tube K), and has 55 percent solids. Gel permeation chromatography shows the polymer to have a weight average molar mass of approximately 7000, and a number average molar mass of approximately 2700.

3.75 inch by 6 inch, 24 gauge zinc phosphate steel panels (Bonderite 37) are wiped with a dry paper towel, wiped with an acetone-soaked paper towel, and then brushed off with a dry camel's hair brush.

Coating formulations are prepared in oven dried, clear glass jars by stepwise addition, with mixing, of 86.13 g of the acrylic polyol solution prepared above (containing 0.103 eq OH), 13.87 g of 1-3,bis(1-isocyanato-1-methylethyl)benzene (0.114 eq NCO), (NCO/OH ratio equals 1.10), and 0.50 g dibutyltin dilaurate, giving a 61 percent solids coating formulation.

The panels are coated immediately after preparation of the coating formulation, using a No. 20 wire-wound RDS ® coating rod to draw the formulation over the panels. The panels are allowed to rest horizontally at room temperature for 24 hours to allow the solvent to evaporate. The panels are then aged 21 days under ambient conditions before testing.

After the 21 day aging period, the panels are placed in a QUV ® weathering cabinet, where they are exposed to continuous cycles of ultra-violet radiation (300 mm, 8 hrs) and heat and moisture (60° C., 4 hours). After 500 hours (3 weeks) exposure, the panels are removed and compared against identical panels which were not subjected to the weathering cabinet.

Gloss is measured according to Whirlpool standard test T-72 using a Gardner glossometer. This instrument measures how well a surface reflects light which is projected at an angle of incidence of 60° and 20°, the latter being a more stringent test. Measurements are recorded as the percent of light reflected by the panel. Higher values indicate greater gloss. Yellowness index is measured according to ASTM-1925 using a Dianomatch ® scan spectrophotometer. Yellowness index is a measurement of the absorption of white light and the 570–580 nm range. The higher the value, the more yellow the specimen. The results of these evaluations are reported in Tables I and II.

The above procedure are repeated using the acrylic polyol prepared above, and other polyisocyanates. Similar coatings and evaluations are also carried out. These results are reported in Tables I and II.

TABLE I

| | | Gloss | | | | | |
|---|---|---|---|---|---|---|---|
| | | 60° | | | 20° | | |
| Sample | Isocyanate | Before | After | % Retention | Before | After | % Retention |
| 1-1 | BIMEB[1] | 88.9 | 88.9 | 100 | 81.9 | 88.7 | 108 |
| 1-2* | DCPDDI[2] | 87.2 | 65.7 | 75.3 | 89.0 | 32.2 | 36.2 |
| 1-3* | Desmodur N[3] | 85.5 | 39.9 | 46.7 | 83.9 | 13.1 | 15.6 |
| 1-4* | Desmodur W[4] | 84.6 | 75.8 | 89.6 | 86.7 | 72.2 | 83.3 |
| 1-5* | IPDI[5] | 85.5 | 56.0 | 65.6 | 80.8 | 26.9 | 33.6 |

*Not an example of the invention.
[1]1,3-bis(1-isocyanato-1-methylethyl)benzene.
[2]Dicyclopentadiene diisocyanate (mixed isomers).
[3]Biuret of 1,6-diisocyanatohexane diisocyanate, sold by Mobay Chemical Corp., Pittsburgh, PA, USA.
[4]Bis-(4-isocyanatocyclohexyl)methane, sold by Mobay Chemical Corp., Pittsburgh, PA, USA.
[5]3-isocyanatomethyl-3,5,5-trimethylcyclohexylisocyanate (also known as isophorone diisocyanate).

TABLE II

| | | Yellowness Index | | |
|---|---|---|---|---|
| Sample | Isocyanate | Before | After | % Increase |
| 1-1 | BIMEB[1] | 11.84 | 17.68 | 5.84 |
| 1-2* | DCPDDI[2] | 12.18 | 43.89 | 31.71 |
| 1-3* | Desmodur N[3] | 11.84 | 70.74 | 58.80 |
| 1-4* | Desmodur W[4] | 11.64 | 35.00 | 23.40 |

*Not an example of the invention.
[1]1,3-bis(1-isocyanato-1-methylethyl)benzene.
[2]Dicyclopentadiene diisocyanate (mixed isomers).
[3]Biuret of 1,6-diisocyanatohexane diisocyanate, sold by Mobay Chemical Corp., Pittsburgh, PA, USA.
[4]Bis-(4-isocyanatocyclohexyl)methane, sold by Mobay Chemical Corp., Pittsburgh, PA, USA.
[5]3-isocyanatomethyl-3,5,5-trimethylcyclohexylisocyanate (also known as isophorone diisocyanate).

What is claimed is:

1. A method for coating a surface with improved gloss and nonyellowing characteristics consisting of
   a. applying to a surface, a mixture comprising
      (i) a first component according to the formula

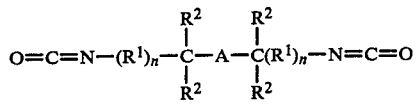

wherein A is an organic radical including at least one aromatic ring; each $R^1$ is independently an aliphatic radical; each n is independently 0 or 1; and each $R^2$ is independently an organic or inorganic radical selected from the group consisting of a halogen and an aliphatic radical having from one to six carbon atoms, and
      (ii) a second component comprising a polyahl; and
   b. curing the mixture;
the ratio of the first component and second component, and the curing step being such that an adherent, solid coating is formed on said surface.

2. The method of claim 1 wherein A is an aromatic ring having from 6 to 12 members forming the ring; each $R^1$ is independently an aliphatic radical having from 1 to 6 carbon atoms; and each $R^2$ is independently, a halogen, or an aliphatic radical having from 1 to 6 carbon atoms.

3. The method of claim 2 wherein A is an aromatic ring having 6 carbon atoms forming the ring; each $R^1$ is independently an aliphatic radical having 1 to 3 carbon atoms; and each $R^2$ is independently an aliphatic radical having 1 to 3 carbon atoms.

4. The method of claim 3 wherein every n is 0; and every $R^2$ is a methyl radical.

5. The method of claim 1 wherein the second component is a polyol.

6. The method of claim 5 wherein the polyol is a glycol ether.

7. The method of claim 5 wherein the polyol is an addition polymer of a hydroxy functional addition polymerizable monomer.

8. The method of claim 7 wherein the polyol is an addition polymer of a hydroxy functional ester of an ethylenically unsaturated carboxylic acid.

9. The method of claim 1 wherein the mixture additionally comprises a catalytic amount of a urethane catalyst.

10. A coated surface produce by the method of claim 1, 2, 4, 5, 8 or 9.

* * * * *